US012411515B2

(12) United States Patent
Ponick et al.

(10) Patent No.: US 12,411,515 B2
(45) Date of Patent: Sep. 9, 2025

(54) KNOB MECHANISM FOR GAS COOKTOP

(71) Applicant: WHIRLPOOL CORPORATION, Benton Harbor, MI (US)

(72) Inventors: Matheus Ponick, Joinville (BR); Rodrigo Schultz, Joinville (BR)

(73) Assignee: Whirlpool Corporation, Benton Harbor, MI (US)

( * ) Notice: Subject to any disclaimer, the term of this patent is extended or adjusted under 35 U.S.C. 154(b) by 527 days.

(21) Appl. No.: 17/868,064

(22) Filed: Jul. 19, 2022

(65) Prior Publication Data

US 2024/0028063 A1 Jan. 25, 2024

(51) Int. Cl.

*G05G 5/00* (2006.01)
*F24C 3/12* (2006.01)
*G05G 1/02* (2006.01)
*G05G 1/10* (2006.01)

(52) U.S. Cl.

CPC ............... *G05G 5/005* (2013.01); *F24C 3/12* (2013.01); *G05G 1/02* (2013.01); *G05G 1/10* (2013.01)

(58) Field of Classification Search

CPC .. F24C 3/12; F24C 3/124; F24C 3/126; F24C 3/122; G05G 5/005; G05G 1/02; G05G 1/10; G05G 1/08; G05G 2505/00; F16K 35/025; F23N 1/007; F23N 2241/08; Y10T 137/7256

USPC ............................................... 126/42; 251/96

See application file for complete search history.

(56) References Cited

U.S. PATENT DOCUMENTS 3,183,336 A * 5/1965 Sopicki .................. B23K 9/291 74/3.5
5,771,878 A 6/1998 Lewis et al.
6,394,081 B1 * 5/2002 Aguirre-Esponda ... F24C 3/124 251/96
8,967,019 B2 * 3/2015 O'Keefe ................ B60K 35/10 74/548

(Continued)

FOREIGN PATENT DOCUMENTS

EP 0283449 B1 8/1991
FR 2514164 A1 4/1983

(Continued)

*Primary Examiner* — Steven B McAllister
*Assistant Examiner* — Amy E Carter
(74) *Attorney, Agent, or Firm* — Brooks Kushman, P.C.

(57) ABSTRACT

A locking mechanism to prevent inadvertent gas flow for a knob for a gas cooktop may include a stem configured to abut the knob in the resting position to prevent actuation of the knob, a locking mechanism movable between a locked position preventing translation of the stem to prevent against unintentional rotation of the knob, and a released position allowing translation of the stem and thus activation of the flow of gas from the burner, the locking mechanism including a rotatable mechanism wherein rotation of the rotatable mechanism moves the locking mechanism from the locked position to the released position, and a button arranged spaced and separate from the knob and attached to a rod extending downward from the button to engage the rotatable mechanism where the rod rotates the rotatable mechanism to translate the locking mechanism to the released position to allow the knob to be depressed in response to actuation of the button and the knob to prevent against unintentional rotation of the knob.

10 Claims, 6 Drawing Sheets

(56) References Cited

U.S. PATENT DOCUMENTS

| | | | | | |
|---|---|---|---|---|---|
| 10,114,405 | B2 * | 10/2018 | Swayne | .................. | G05G 5/06 |
| 11,960,315 | B1 * | 4/2024 | Lawson | ................. | G05G 1/082 |
| 2015/0370283 | A1 * | 12/2015 | Lawson | ................. | G05G 1/082 74/553 |
| 2019/0101294 | A1 | 4/2019 | Horovitz | | |
| 2019/0360610 | A1 | 11/2019 | Galeano Flores et al. | | |

FOREIGN PATENT DOCUMENTS

| | | | | | |
|---|---|---|---|---|---|
| GB | 178274 | A | | 4/1922 | |
| GB | 2344881 | A | * | 6/2000 | ............. F24C 3/124 |
| JP | S56122899 | U | | 9/1981 | |
| KR | 19980029618 | U | | 8/1998 | |

* cited by examiner

KNOB MECHANISM FOR GAS COOKTOP

TECHNICAL FIELD Described herein are locking systems for a knob mechanism for gas cooktops.

BACKGROUND

A cooking appliance is used to cook meals and other foodstuffs on a cooktop or within an oven. The cooking appliance typically includes various control switches and electronics to control the heating elements of the cooking appliance.

SUMMARY

A knob assembly for a gas cooktop may include a knob configured to control a flow of gas from a burner of a cooktop starting at a resting position, a stem configured to abut the knob in the resting position to prevent actuation of the knob, a locking mechanism having a locked position preventing translation of the stem and unintentional rotation of the knob and a released position allowing translation of the stem and thus activation of the flow of gas from the burner, the locking mechanism including a rotatable mechanism, wherein rotation of the rotatable mechanism moves the locking mechanism from the locked position to the released position, and a button arranged spaced and separate from the knob and attached to a rod extending downward from the button to engage the rotatable mechanism where the rod rotates the rotatable mechanism to translate the locking mechanism to the released position to allow the knob to be depressed in response to actuation of the button and the knob to prevent against unintentional rotation of the knob.

In one embodiment, the locking mechanism is moved away from the stem and towards the rod in response to rotation of the rotatable mechanism by the rod.

In another example, a spring is arranged at the stem to bias the knob in the resting position.

In a further embodiment, the locking mechanism is a lever extending perpendicular to the stem.

In one embodiment, the rotatable mechanism is a wheel arranged coplanar with the rod such that the wheel moves with actuation of the rod and pulls the locking mechanism away from the stem.

In another example, the rotatable mechanism includes a torsion spring configured to bias the rotatable mechanism in the locked position.

A locking mechanism to prevent inadvertent gas flow for a knob for a gas cooktop may include a stem configured to abut the knob in the resting position to prevent actuation of the knob, a locking mechanism movable between a locked position preventing translation of the stem to prevent against unintentional rotation of the knob, and a released position allowing translation of the stem and thus activation of the flow of gas from the burner, the locking mechanism including a rotatable mechanism wherein rotation of the rotatable mechanism moves the locking mechanism from the locked position to the released position, and a button arranged spaced and separate from the knob and attached to a rod extending downward from the button to engage the rotatable mechanism where the rod rotates the rotatable mechanism to translate the locking mechanism to the released position to allow the knob to be depressed in response to actuation of the button and the knob to prevent against unintentional rotation of the knob.

In one embodiment, the locking mechanism is movable away from the stem and towards the rod in response to rotation of the rotatable mechanism by the rod.

In another example, a spring is arranged at the rod to bias the knob in the resting position.

In a further embodiment, the locking mechanism is a lever extending perpendicular to the stem.

In one embodiment, the rotatable mechanism is a wheel arranged coplanar with the rod such that the wheel moves with actuation of the rod and pulls the locking mechanism away from the stem.

In another example, the rotatable mechanism includes a torsion spring configured to bias the rotatable mechanism in the locked position.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompanying drawings in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Knobs in gas cooktops and freestanding ranges are often sensitive to actuation and may be accidentally turned on. While not intended, such accidental actuations or rotations may release gas unknowingly. As described in detail herein, an improved system allows for an additional locking mechanism to prevent the unintended actuation during of the knob. This locking mechanism may ensure that any release of gas is in response to actuations that are deliberate and not accidental.

Current knobs may have a two-step initial activation, including pushing the knob and then rotating the knob to a desired position to release gas. The knob, and consequently the gas valve, could be initially activated by accident, allowing for gas leakage.

Disclosed herein is a knob assembly having a locking assembly that requires an actuation of a third mechanism, in addition to the two-step initial activation, for gas release. In this example, the third mechanism may include a button arranged separate and distinct from the knob assembly. The knob assembly may also include a stem, cooperating with the button, that locks the knob by preventing the knob from being pushed in the first place. Actuation of the button may release the stem from engaging the knob to allow the knob to be depressed and subsequently rotated to activate the gas flow.

In practice, a rod or other suitable mechanical feature may block the stem from moving downward when the knob is locked. The rod may be released by pressing of the button, in some examples, by rotation of the rod body caused by pressing of the button. The rod may have a torsion spring attached to it, so the rod may be biased to the locked position when the knob is at the off or resting position. However, the knob may return to the locked position freely after it was released and turned to the desired location. In this case, the stem may automatically return to the locked position with the knob. The return of the knob to the locked position may occur automatically using a spring mechanism engaging the stem and/or rod, not requiring another step to turn the knob off.

Thus, if the activation was accidental, the rod may block the stem from moving downward and thus prevent depression of the knob. This prevents the knob from leaving its initial locked position and releasing gas without the spark.

Figure 1:
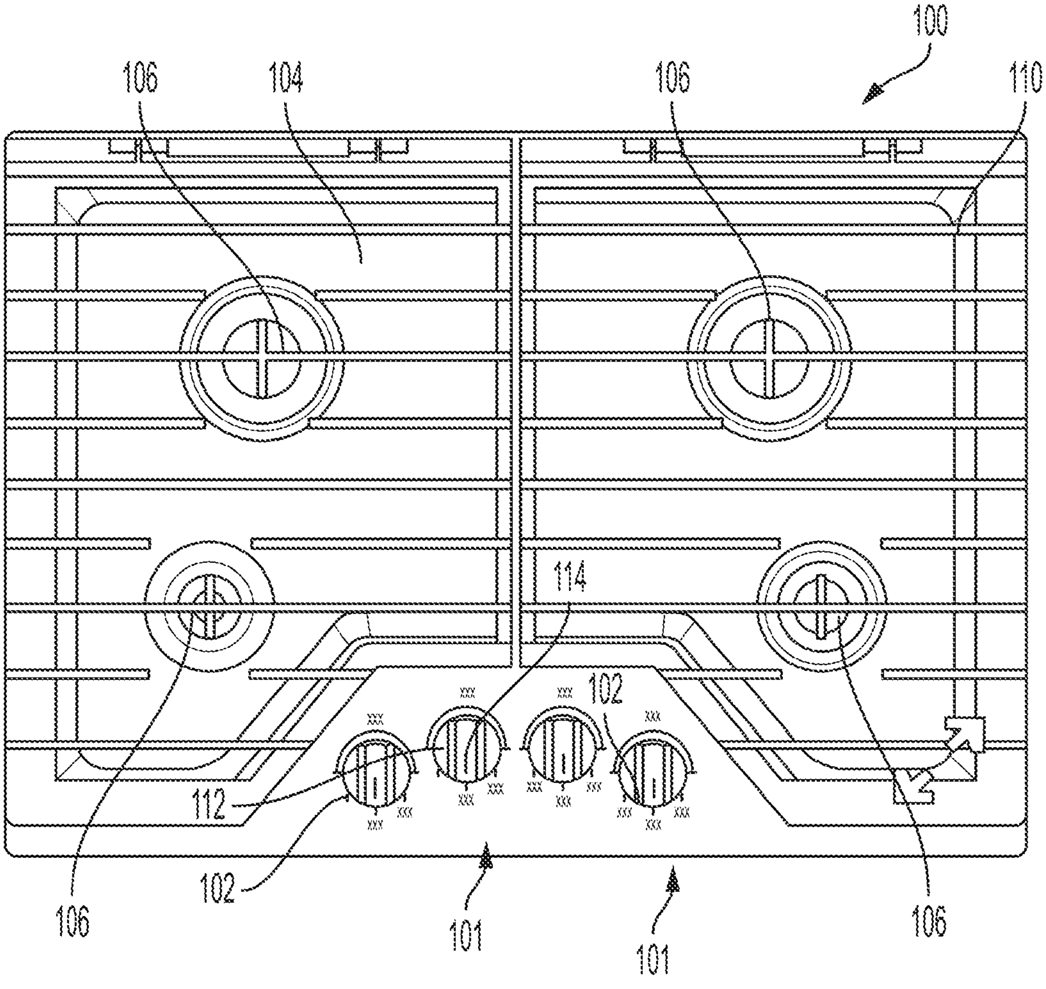
FIG. 1 illustrates an example cooktop, such as a gas cooktop.

FIG. 1 illustrates an example cooktop 100, such as a gas range assembly. The cooktop 100 may include a cooking area 104 having a plurality of burners 106, each controlled by a knob assembly 101 having a knob 102. Each separately controlled burner 106 is dedicated to supplying heat to a corresponding area of the cooking area 104. The heat supplied to each separately controlled heating area is controlled such that a command to change the heat supplied to it may not change the amount of heat supplied to any other separately controlled cooking area 104. In the example of FIG. 1, the cooktop 100 has four separately controlled cooking areas 104, but more or fewer cooking areas 104 may be included.

One or more grates 110 may be arranged above the cooking area 104 in order to maintain cookware thereon a predefined distance above the burners 106. Each grate 110 may be made of metal, iron, or some other thermally conductive element. Each burner 106 may be operable to heat to desired cooking temperatures. In an example, each knob 102 is configured to control the flow of gas to a respective one of the burners 106. The knobs 102 may be labeled to allow a user to identify which knob 102 controls which of the burners 106. The burners 106 are configured to generate controlled flames that may be used to heat cookware arranged on the grate 110. The magnitude of the flame generated by the burners 106 is proportionate to the amount of gas flowing to the burners 106. A user may adjust the flow of gas to the burners 106 using the knobs 102. As the user rotates each of the knobs 102, a gas control valve (not shown) changes the amount of gas flowing to the corresponding burner 106.

While the knobs 102 in the example of FIG. 1 are illustrated as being arranged on top of the cooking area 104, the knobs may also be arranged on a front surface of a manifold of the cooktop 100. The knobs 102 may include markings therearound to indicate a certain level of heat being supplied by the burner 106 relative to the rotational position of the knob 102. For example, markings associated with a high, medium, low, simmer settings may be included. Each knob 102 has a face 112 with a grip 114 extending outwardly from the face 112. It should be appreciated that in other embodiments each knob 102 may be contemplated, such as the knob 102 being shaped as a cylinder or oval without a grip. Although not shown, a grate cover may be arranged over the grates to create a surface that protects the cooking area 104 as well as providing for additional surface space.

Figure 2:
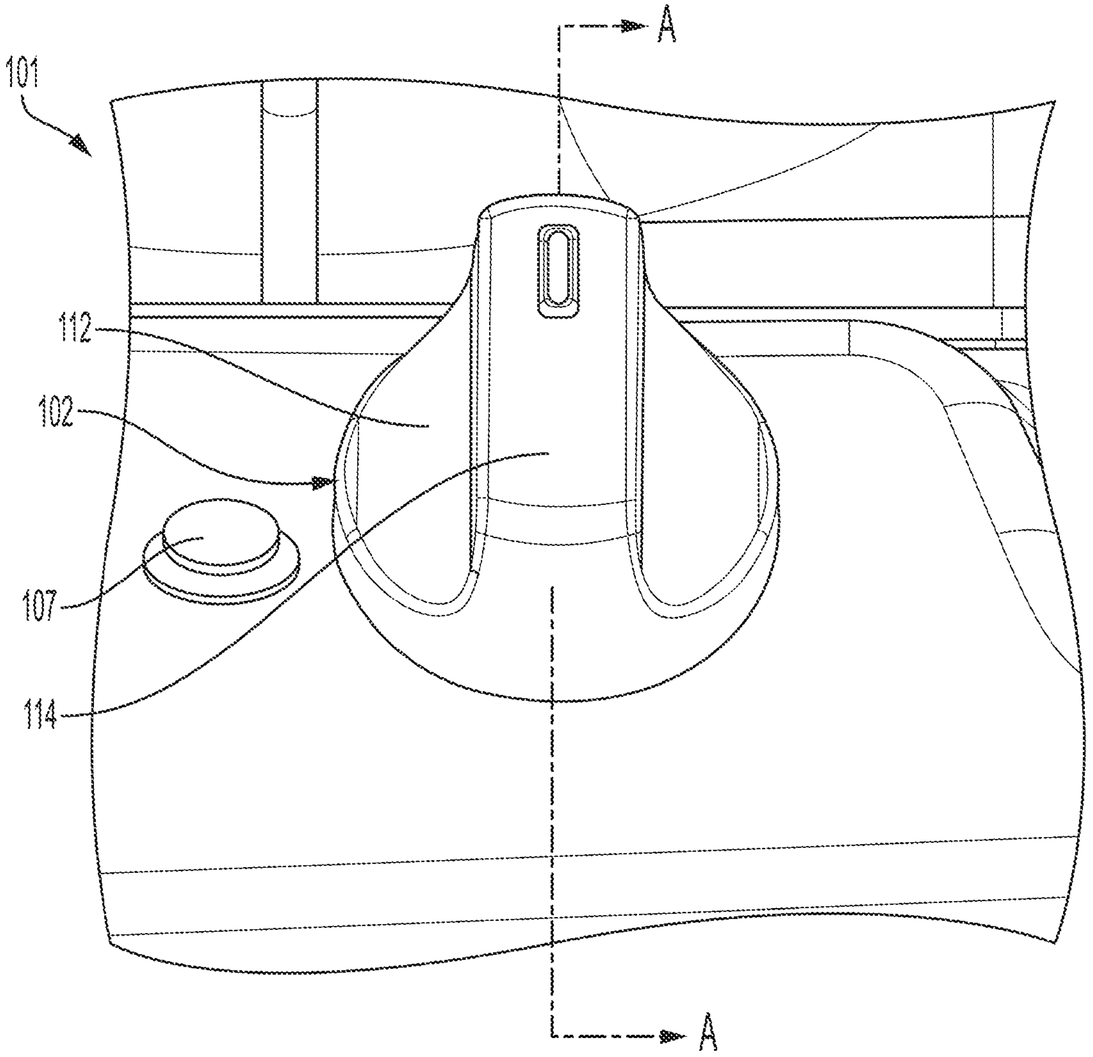
FIG. 2 illustrates an example knob assembly of the cooktop of FIG. 1.

FIG. 2 illustrates an example knob assembly 101 of the cooktop of FIG. 1. The knob assembly 101 may include the knob and a button 107, or other suitable actuation element. The button 107 may be arranged separate but near the knob 102 so that actuation of the button 107 and the knob 102 can be achieved concurrently or near concurrently (e.g., the button 107 being engaged prior to engagement of the knob 102). Upon concurrent or near concurrent depression of the knob 102 and the button 107, a locking mechanism (not shown in FIG. 2) may move from a locked state or position to a released position or state and allow the knob 102 to rotate to the desired position to release gas to the burner 106. In the locked state, the knob 102 may be prevented by the locking mechanism from being depressed and thus prevented from rotating. Because of this, inadvertent actuation of the knob 102 may be prevented.

Figure 3:
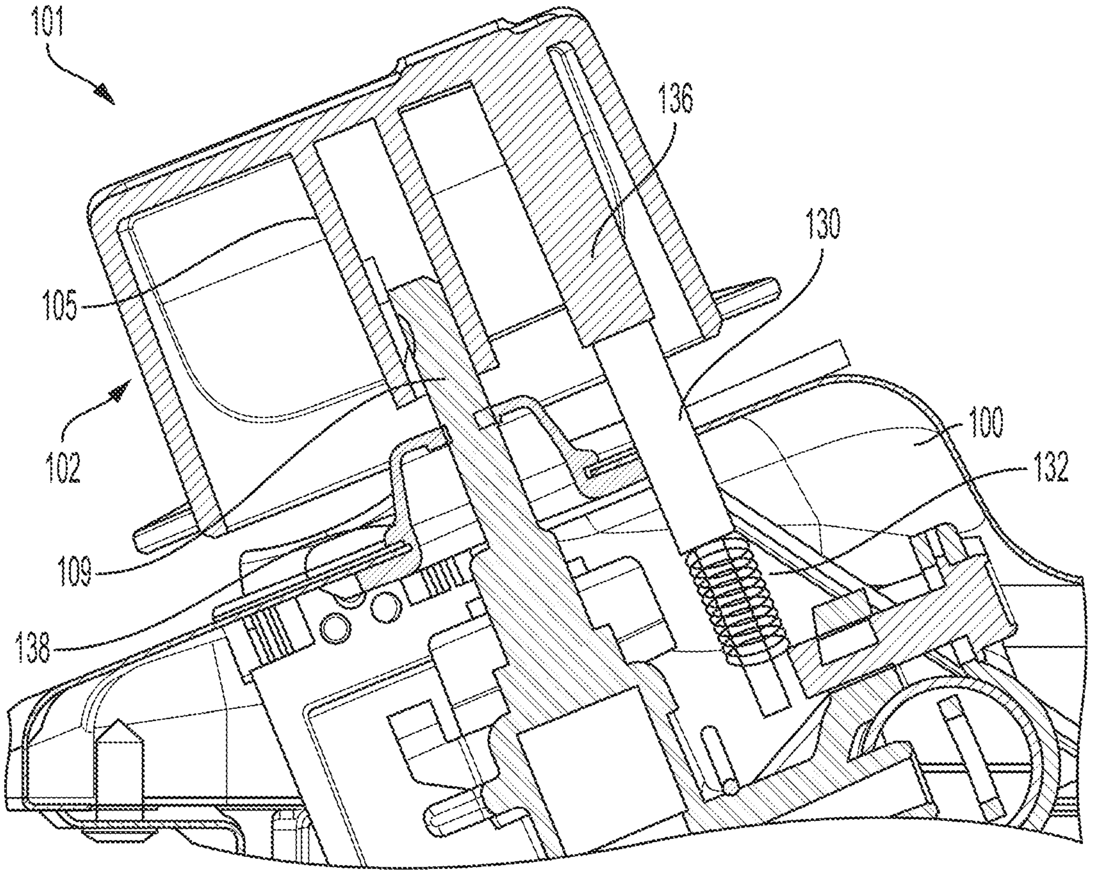
FIG. 3 illustrates a cross-sectional view of the knob assembly of FIG. 2 taken along A-A', where the locking mechanism is in a locked position.

FIG. 3 illustrates a cross-sectional view of the knob assembly 101 of FIG. 2, where the knob assembly 101 includes the locking mechanism in the locked state. As explained, the knob 102 may include grip 114 configured to engage with the user's fingers to apply pressure to rotate and actuate the knob 102. The grip 114 may also indicate a rotational location of the knob 102, thus indicate the flow level of gas such as high, medium, low, etc. When a user applies pressure to the knob 102, the knob 102 may be pushed downward into a bezel 138 and subsequently rotated.

The knob 102 may define a hollow interior. A support cylinder 105 may extend from the underside of the grip 114 through the inside center of the knob 102. The cylinder 105 may form a hollow opening having a generally cylindrical shape and a flat side. The cylinder 105 may be configured to receive a post 109 during assembly of the knob assembly 101 onto the cooktop 100. Although not shown, a spring may be arranged within the cylinder 105 to bias the knob 102 away from the cooktop 100 in the resting position (e.g., not pushed into the bezel 138).

A stem 130 may extend from within the cooktop 100 through to the surface and be configured to abut the underside of the knob 102. In one example, the hollow interior of the knob 102 may define a stop 136 configured to align with the stem 130 and abut the stem 130 in the resting and locked position. The stem 130 may alternatively extend from the knob 102 and into the cooktop. The stem 130 is arranged generally perpendicular with the cooktop surface. Within the cooktop 100, a spring 132 may be arranged at a distal end of the stem 130 to bias the stem 130 such that the knob is biased in the resting position. When compressed, the spring 132 may create some resistance when the user depresses the knob 102, but still allow the user to depress and subsequently rotate the knob 102.

Figure 4:
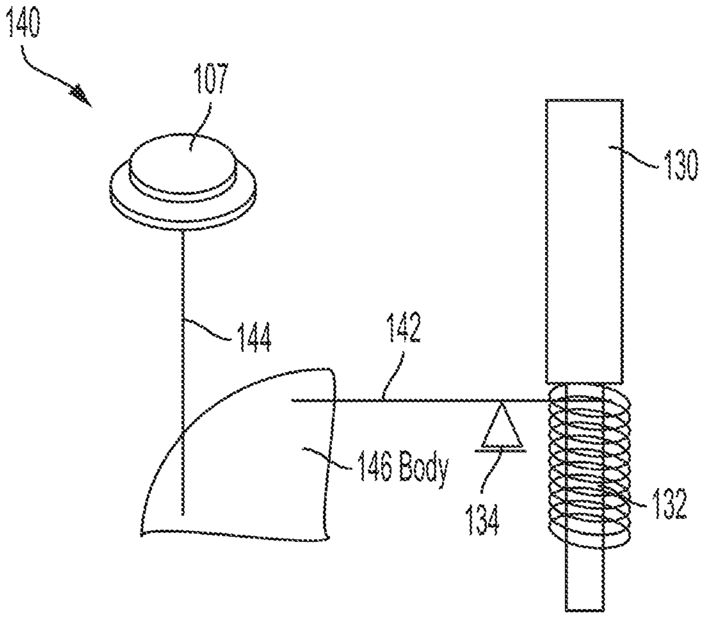
FIG. 4 illustrates a schematic diagram of a portion of the knob assembly of FIG. 2, where the locking mechanism is in a locked position.

FIG. 4 illustrates a schematic diagram of a locking assembly 140 of the knob assembly 101 of FIG. 2, where the locking assembly 140 is in a locked state. The locking assembly 140 may be arranged within the cooktop and may be used to prevent actuation of the knob 102 without dual actuation of the button 107 and the knob 102. The locking assembly 140 may include the stem 130 and spring 132, as well as the button 107. Further, the locking assembly 140 may include a locking mechanism 142, a rod 144, and a rotatable mechanism 146.

The rod 144 may operatively extend from the button 107 and engage with the rotatable mechanism 146. The rotatable mechanism 146 may be fixed at a pivot and rotatable about that pivot (not shown). In one example, the rotatable mechanism 146 may be a wheel, or semicircular shape. In other examples the rotatable mechanism 146 may be other shapes. The rotatable mechanism 146 may be generally flat or planar and extend along and coplanar with the rod 144.

Both the rod 144 and the locking mechanism 142 may be fixed to the rotatable mechanism 146. In the locked position or locked state, the locking mechanism 142 abuts the distal end of the stem 130. This prevents the stem 130 from translating towards the spring or further into the cooktop 100 and thus prevents depression of the knob 102. The spring 132 also biases the locking mechanism against the stem 130 in the locked position. The stem 130 may be a solid cylinder or block, and also may be a hollow tub-like support arranged on a post 148. In this example, the stem 130 may selectively move along the post 148.

The locking mechanism 142 may be a lever extending perpendicular to the stem 130, and in some examples may extend perpendicular to the rod 144. The locking mechanism 142 and rod 144 may be made of rigid materials such as metal, plastic, resin, etc., and may be configured to hold their shape in the heated environment of the cooktop. In one example, the locking mechanism 142 is a metal rod or post. In another example, the lever is a metal bracket.

The locking mechanism 142 may be maintained on a support structure 134 to aid in maintaining the locking mechanism 142 perpendicular to the stem 130 and/or the rod 144. The support structure 134 may not be fixed to the locking mechanism 142 but instead simply support the locking mechanism and allow the locking mechanism 142 to move a across the support structure between the locked and released positions.

Figure 5:
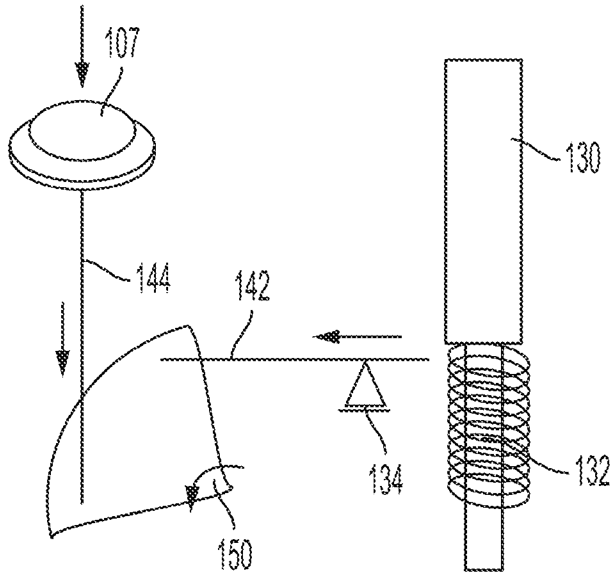
FIG. 5 illustrates a schematic diagram of a portion of the knob assembly of FIG. 2, where the locking mechanism is in a released position.

FIG. 5 illustrates a schematic diagram of the locking assembly 140 of the knob assembly 101 of FIG. 2, but where locking assembly 140 is in a released state. In this example, the locking mechanism 142 may be in the released state where the locking mechanism 142 is released from the distal end of the stem 130 such that the stem 130 may be translated into the cooktop when the knob 102 is depressed. Because the locking mechanism 142 is pulled toward the rod 144 and away from the stem 130 in the released state (via actuation of the button 107), the locking mechanism 142 no longer abuts the stem 130 and allows the stem 130 to depress the spring 132. That is, translation of the rod 144 caused by actuation of the button 107 rotates the rotatable mechanism 146. This in turn pulls the locking mechanism 142 away from the stem 130 and allows for depression of the knob 102 (via compression of the spring 132).

Once the locking mechanism is in the released position or state, the knob 102 may be rotated and move freely to its desired position to allow the desired flow of gas. Once the knob 102 is initially depressed and rotated, the knob 102 may be further rotated without depression of the button 107. That is, each time the user wishes to adjust the flow of gas, it is not necessary to again depress the button 107. Further, the knob 102 may be returned to the resting or closed position without actuation at the button. As such, actuation of the button 107 may only be required when actuating the knob 102 from the resting position where the gas flow is off Including to rotate the knob back to a closed position of the knob will turn the gas flow off As illustrated in FIG. 5, actuation of the button 107 forces translation of the rod 144. The rotatable mechanism 146 is forced to rotate about the pivot point by the rod 144 and concurrently the rotatable mechanism 146 pulls the locking mechanism 142 from its blocking position at the stem 130 to an unblocked position. This unblocked position then allows the user to rotate the knob 102, while also preventing against inadvertent actuation at the knob that may lead to a gas release.

Figure 6:
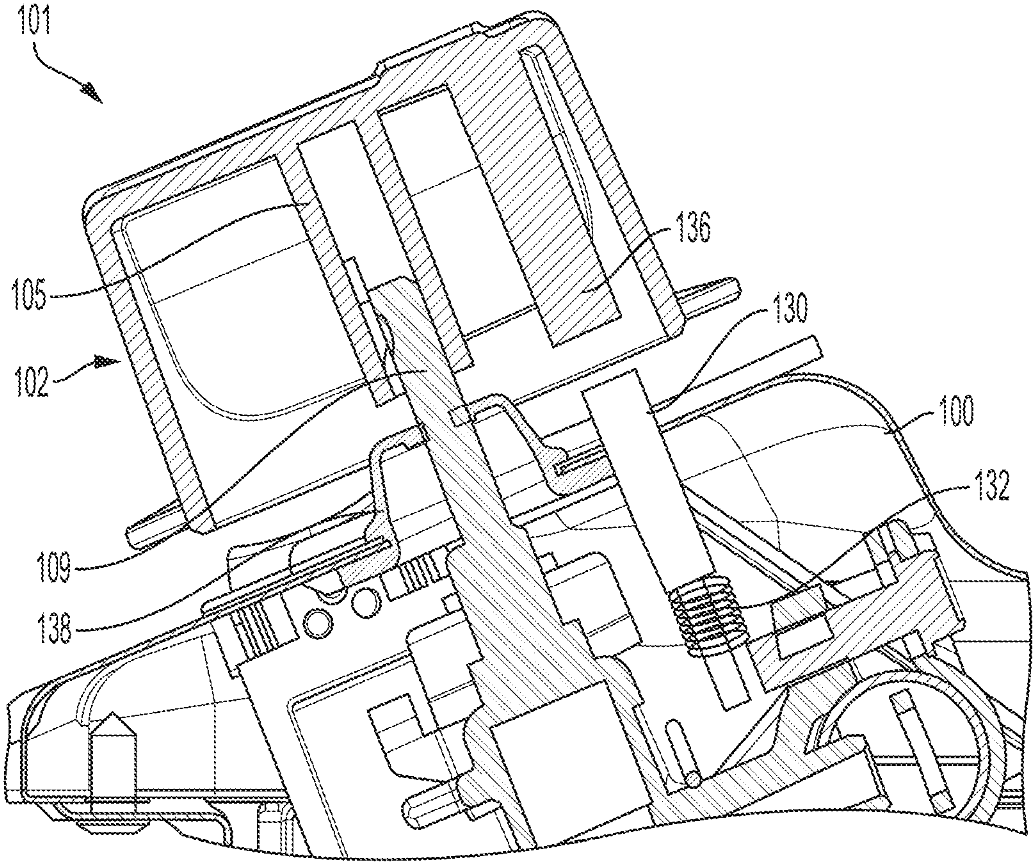
FIG. 6 illustrates a cross-sectional view of the knob assembly of FIG. 2, where the locking mechanism is in a released position.

FIG. 6 illustrates a cross-sectional view of the knob assembly 101 of FIG. 2, where the locking assembly 140 is in a released state. As explained, the knob 102 may include the grip 114 configured to engage with the user's fingers to apply pressure to rotate and actuate the knob 102. When a user applies pressure to the knob 102, the knob 102 may be pushed downward into a bezel 138 and subsequently rotated.

The knob 102 may define a hollow interior and the support cylinder 105 may extend from the underside of the grip 114 through the inside center of the knob 102. The cylinder 105 may be configured to receive the post 109 during assembly of the knob assembly 101 onto the cooktop 100. The stem 130 may extend from the cooktop 100 where the stem 130 is generally perpendicular with the cooktop surface. In this released position, the stem 130 may be depressed with the knob 102 because the locking mechanism 142 is not blocking the stem 130. As explained above with respect to FIG. 4, the stem 130 may be a hollow tube arranged on and movable along the post 148. The stem 130 may also be a solid cylinder or bock. Within the cooktop 100, the spring 132 may be arranged at a distal end of the stem 130 to bias the stem 130 in the resting position. When compressed, the spring 132 may create some resistance when the user depresses the knob 102, but still allow the user to depress and subsequently rotate the knob 102. The spring 132 may bias the return to the locking position, once the knob is rotated to the closed state.

As illustrated in FIG. 6, the spring 132 is depressed with the knob since the locking assembly 140 is in the released state, allowing the user to freely actuate the knob 102.

In the resting position (i.e., where the knob 102 is not depressed, the button 107 is not actuated, and the locking assembly 140 is in the locked state), should the knob 102 be turned, bumped, etc., the locking assembly 140 will prevent the knob 102 from moving. Gas will not be released, and the bias may ensure that any depression and rotation of the knob are deliberate and release of gas is in response to actuations are not accidental. If the rotation was done on purpose by a user, the user must actuate the button 107, and depress and continue to rotate the knob 102 until the spark starts to produce a sound and gas is flowing to the burner. After the initial rotation, the knob 102 may move freely to allow the user to select the desired position of the knob 102 for the desired gas flow, without additional actuation of the button 107, as the locking mechanism is in the released state.

Accordingly, a knob assembly is disclosed that prevents inadvertent actuation from releasing gas accidentally.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

What is claimed is:

1. A knob assembly for a gas cooktop, comprising:

a knob configured to control a flow of gas from a burner of a cooktop starting at a resting position;

a stem configured to abut the knob in the resting position to prevent actuation of the knob;

a locking mechanism having a locked position preventing translation of the stem and unintentional rotation of the knob and a released position allowing translation of the stem and thus activation of the flow of gas from the burner, the locking mechanism cooperating with a rotatable mechanism, wherein rotation of the rotatable mechanism translates the locking mechanism from the locked position to the released position; and a button arranged spaced and separate from the knob and attached to a rod extending downward from the button to engage the rotatable mechanism, where the rod rotates the rotatable mechanism to move the locking mechanism to the released position to allow the knob to be depressed in response to actuation of the button and the knob to prevent against unintentional rotation of the knob, where the locking mechanism is moved laterally away from the stem and towards the rod in response to rotation of the rotatable mechanism by the rod.

2. The assembly of claim 1, further comprising a spring arranged at the stem to bias the knob in the resting position.

3. The assembly of claim 1, wherein the locking mechanism is a lever extending perpendicular to the stem.

4. The assembly of claim 1, wherein the rotatable mechanism is a wheel arranged coplanar with the rod such that the wheel moves with actuation of the rod and pulls the locking mechanism away from the stem.

5. The assembly of claim 1, wherein the locking mechanism creates a stop and blocks the stem from translation from the locked position.

6. A knob assembly to prevent inadvertent gas flow for a knob for a gas cooktop, comprising:

a knob;

a stem configured to abut the knob in a resting position to prevent actuation of the knob;

a locking mechanism movable between a locked position preventing translation of the stem to prevent against unintentional rotation of the knob, and a released position allowing translation of the stem and thus activation of the flow of gas from the burner, the locking mechanism cooperating with a rotatable mechanism wherein rotation of the rotatable mechanism translates the locking mechanism from the locked position to the released position; and a button arranged spaced and separate from the knob and attached to a rod extending from the button to engage the rotatable mechanism, where the rod rotates the rotatable mechanism to move the locking mechanism to the released position to allow the knob to be depressed in response to actuation of the button and the knob to prevent against unintentional rotation of the knob, where the locking mechanism is laterally movable away from the stem and towards the rod in response to rotation of the rotatable mechanism by the rod.

7. The knob assembly of claim 6, further comprising a spring arranged at the rod to bias the stem to the resting position.

8. The knob assembly of claim 6, wherein the locking mechanism is a lever extending perpendicular to the stem.

9. The knob assembly of claim 6, wherein the rotatable mechanism is a wheel arranged coplanar with the rod such that the wheel moves with actuation of the rod and pulls the locking mechanism away from the stem.

10. The knob assembly of claim 6, wherein the locking mechanism creates a stop and blocks the stem from translation from the locked position.

* * * * *